(No Model.)
C. A. & J. H. MILLER.
ROAD CART.
No. 438,701. Patented Oct. 21, 1890.
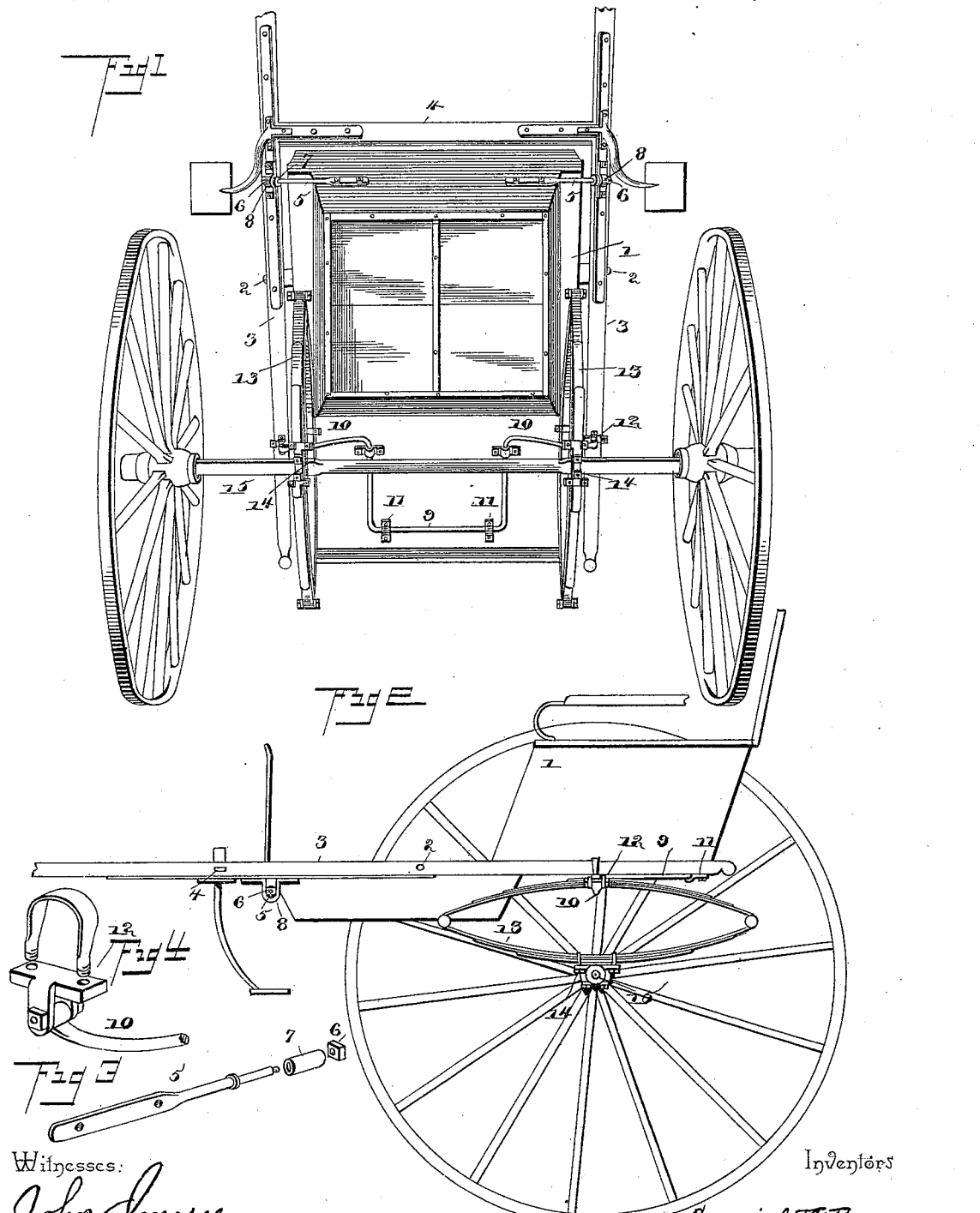

UNITED STATES PATENT OFFICE.

CARMI A. MILLER AND JOHN H. MILLER, OF SPRING VALLEY, ILLINOIS.

ROAD-CART.

SPECIFICATION forming part of Letters Patent No. 438,701, dated October 21, 1890.

Application filed September 28, 1889. Serial No. 325,396. (No model.)

*To all whom it may concern:*

Be it known that we, CARMI A. MILLER and JOHN H. MILLER, citizens of the United States, residing at Spring Valley, in the county of Bureau and State of Illinois, have invented a new and useful Road-Cart, of which the following is a specification.

This invention has relation to road-carts, and among the objects in view are to provide a road-cart incapable of any lateral motion and so constructed as to overcome all horse motion.

A further object of the invention is to accomplish the above in a cheap and simple manner and with as few parts as possible.

Other objects and advantages of the invention will hereinafter appear, and the novel features thereof will be particularly pointed out in the claims.

Referring to the drawings, Figure 1 is a bottom perspective, the cart being tilted to the rear. Fig. 2 is a side view with one wheel removed. Fig. 3 is a detail in perspective of one of the safety-irons. Fig. 4 is a detail view representing the connection between the torsion-spring and the thills.

Like numerals of reference indicate like parts in all the figures of the drawings.

1 represents the body of any of the usual constructions, to the sides of which, forward of the seat, are pivoted by bolts 2 the opposite thills 3, the rear ends of which terminate slightly in rear of the body, said thills being connected in front of the dash by the usual cross-tree 4. From the front of the body at each side there project laterally safety-irons 5, the ends of which are provided with binding-nuts 6, and in rear of the nuts with a rubber or other elastic sleeve 7.

8 represents safety loops or straps, which project from each of the thills downwardly and loosely receive the safety-irons, thus limiting the pivotal vertical swing of the front end of the body.

9 represents a torsion-spring secured by clips 11 to the under surface of the body near its rear end, the branches of the spring being bent outwardly to form suspension-arms 10, the ends of which are secured by shackles 12 to the under surfaces of the thills 3 under the seat of the vehicle.

13 represent opposite bow-springs, the upper portions of which are clipped to the under surface of the body at each side thereof and at about a point opposite the shackles 12. The lower portions of the spring 13 are clipped, as at 14, to the axle 15, to the ends of which are applied the usual wheels 16.

By this invention it will be apparent that any lateral motion of the body upon the springs will be impossible, and that the vertical motion will be gradual and free from sudden jerks, and that in case a breakage of the springs should occur the irons 5 and safety-straps 8 will prevent any lowering of the front end of the wagon, said body being pivotally connected with the shafts and moving in a uniform easy manner.

Having described our invention, what we claim is—

1. In a two-wheeled vehicle, the combination, with the body, of the opposite thills or shafts pivotally connected intermediate their ends to the body, a torsion-spring secured to the body and having its terminals shackled to the thills, opposite bow-springs secured to the body in line with the shackles, and the axle clipped to the bow-springs, substantially as specified.

2. The combination, with the body, of the shafts or thills pivoted thereto intermediate their ends, the opposite side springs 13, arranged at each side of the body, the axle clipped to the springs, the torsion-spring 9, the branches of which are laterally projected, as at 10, and shackled to the thills, as at 12, substantially as specified.

3. The thills, the axle, the bow-springs clipped to the axle, and the body secured to the bow-springs, the latter being arranged transverse to the axle and longitudinally with relation to the body, and the torsion-spring secured to the bottom of the body and having the branches extending out from each side and pivoted to the thills, as set forth.

4. The thills, the axle, the bow-springs clipped to the axle, and the body secured to the bow-springs, the latter being arranged transverse to the axle and longitudinally with relation to the body, and the torsion-spring secured to the bottom of the body and having the branches extending out from each side and pivoted to the thills, the safety-straps 8, secured to the thills, and the safety-irons 5, secured to the body and having limited movement in the safety-strap, as set forth.

5. In a road-cart, the combination of the thills, the body pivoted thereto at an intermediate point, the torsion-spring arranged transversely across the bottom of the body, secured thereto, and shackled to the thills, the bow-springs connecting the axle and body and arranged at right angles to the torsion-spring, and the safety-strap connections at the front end of the body in advance of the pivot thereof, as set forth.

In testimony that we claim the foregoing as our own we have hereto affixed our signatures in presence of two witnesses.

CARMI A. MILLER.
JOHN H. MILLER.

Witnesses:
GEORGE F. TRENDT,
FAYETTE S. JOHNSON.